Figure 1:
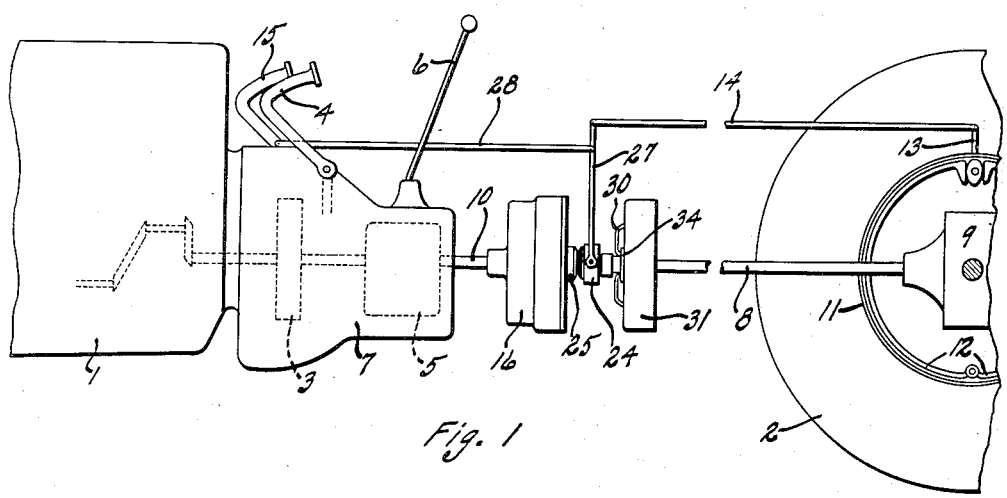

July 3, 1934.                F. R. HIGLEY                1,965,119
                     LOCOMOTION CONTROL FOR VEHICLES
                           Filed Nov. 20, 1931

INVENTOR
Frank R. Higley
BY
Brockett, Hyde, Higley & Meyer
ATTORNEYS

Patented July 3, 1934

1,965,119

UNITED STATES PATENT OFFICE 1,965,119

LOCOMOTION CONTROL FOR VEHICLES

Frank R. Higley, Cleveland Heights, Ohio

Application November 20, 1931, Serial No. 576,281

5 Claims. (Cl. 192—13)

This invention relates to locomotion control for vehicles such as for example, the usual automotive vehicle having motor means such as an internal combustion engine arranged to drive two or more of its wheels, the vehicle including brake means for the wheels.

The characteristic drive between motor and wheel includes a friction clutch, a multiple speed gear set, a propeller shaft running to the axle and a differential in the axle. Recently what is exploited as "free wheeling" has come into vogue, consisting essentially of merely an overrunning clutch, usually located between the transmission and the axle, permitting the motor to drive the axle but allowing the axle to overrun the motor; so that when the vehicle is in motion and the power is cut off as by throttling the engine, the vehicle may continue in motion under the power of its momentum, without expenditure of the latter in overdriving the engine.

Such an arrangement has numerous advantages but has some disadvantages as well. One of these is that during the overrunning period the engine may stall without warning to the operator until its power is later required, perhaps at a critical time. Another disadvantage is that the vehicle is deprived of the more or less effective braking power which is had when the drive is positive in both directions, that is, when the engine is driven by the wheels after closing of the throttle. Also, the electric generator which is usually directly coupled to the engine for the purpose of charging the usual starting and lighting battery, has shorter periods of effective running speeds so that its output or charging rate must be increased.

The general object of my invention is to overcome these disadvantages. Briefly, the invention comprises the provision of friction clutch means which may be separate from, or incorporated as a part of, the overrunning clutch means, in parallel relation with the latter so that both clutch means control the same interruption or break in the drive, whereby, through the wheels may be overrunning the engine, the overrunning clutch being disengaged, yet the friction clutch may be engaged at the will of the operator, that the wheels may pick up the motor or engine, the load of the latter becoming effectively additional braking power.

Obviously since for the most part there will be no drive from wheels to engine through the friction clutch, this is logically of the type known as normally disengaged, that is, it is arranged to be engaged by the operator rather than to be disengaged by the operator as is the usual clutch between engine and transmission.

Since the braking power of the engine will only be wanted when the vehicle is to be decelerated, as a further object of my invention I provide means interassociating the friction clutch means with the usual vehicle brake means for actuation of both by a common control, to cause engagement of the friction clutch means dependent upon application of the brake means. Thus engagement of the friction clutch means is had when desirable, without conscious effort on the part of the operator, who merely depresses his brake pedal as before, when he wishes to decelerate.

For the above purpose, as a further object of my invention I so arrange the common control for friction clutch and brake means as to include a differential means whereby the harder the brake is applied the harder the friction clutch will be engaged; yet since engagement of the friction clutch must be gradual, I so provide the differential relationship that the greater part of the decelerating power, the operator effort, will be effective upon the brakes rather than upon the clutch.

Obviously disastrous results might follow sudden engagement of the clutch, with the vehicle "free wheeling" at a high rate of speed. Therefore, as another object of my invention, I provide speed responsive means and so arrange the same that the higher the vehicle speed, the more gradual or delayed will be the engagement of the clutch. More specifically, and in view of the differential arrangement just described, according to my invention the speed responsive means is arranged to oppose engagement of the friction clutch means dependent upon the speed of the vehicle, so that the greater the vehicle speed, the more directly will the braking effort be applied to the wheels, and the less will it be effective upon the clutch.

Figure 2:
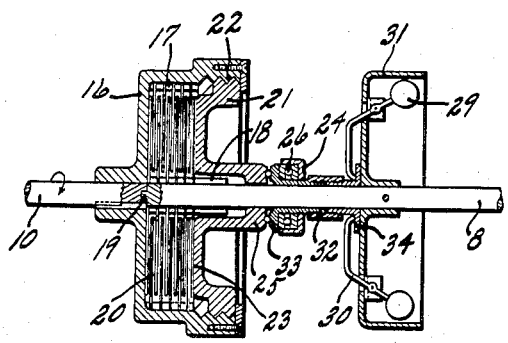

The exact nature of this invention together with further objects and advantages thereof will be apparent from the following description taken in connection with the accompanying drawing, in which Fig. 1 is a conventionalized showing of an embodiment of my device as installed in a vehicle, pertinent associated parts of the vehicle being included; and Fig. 2 is a detail view in longitudinal section of the same embodiment of the device itself.

With reference now to the drawing, 1 represents the engine of a vehicle, and 2, one of the driving wheels thereof. The engine 1 has associated therewith to form a unit power plant, the usual clutch 3 controlled by the pedal 4, and the usual gear set 5 controlled by the shifting lever 6, all carried by the housing 7.

For the present purpose it may be assumed that these parts are all arranged to function in the well known manner which has become the standard throughout the automotive industry; the clutch 3 being a friction clutch having associated springs maintaining it engaged, and disengageable by depression of the pedal 4; and the gear set 5 being of the well known sliding gear type wherein speed changes may be had by shifting of the lever 6 upon disengagement of the clutch 3.

The wheel 2 is mounted upon an axle driven by propeller shaft 8 through the usual driving and differential gearing in the axle housing 9, the shaft 8 being in line with the shaft 10 leading from the power plant.

The wheel 2 has an associated brake drum 11 with related internal expanding shoes 12 actuated through the lever 13 by the pull rod 14, which pull rod may have connection with the brake pedal 15, adjacent the clutch pedal 4 whereby depression of the brake pedal will cause application of the brake.

What has thus far been described will be recognized as typical construction in automotive practice.

According to this invention the shafts 8 and 10, are separate shafts having a clutch coupling therebetween. The nature of this coupling is such that when the vehicle is in forward motion, with the engine running, gears of the gear set 5 engaged to provide a drive and the friction clutch 3 engaged, the engine 1 will drive the wheel 2 until the former be operating at a sufficient relative speed. This is accomplished by connecting the shafts 8 and 10 by what is known as overrunning clutch means. I prefer that such clutch means be of a type to provide smooth frictional engagement; and illustrate in Fig. 2 the details of one such form of clutch. This clutch is of multiple disk type, comprising an outer member 16 secured with the shaft 10 and having inwardly extending teeth 17, and an inner member which is here shown as comprising simply teeth 18 upon the adjacent end of the shaft 8 which may have free bearing with the shaft 10 as at 19. A plurality of friction disks 20 are mounted between the teeth 17 and the teeth 18, some of these disks having peripheral teeth for engaging the teeth 17 of the outer clutch member 16 and the remaining disks having inner teeth to engage the teeth 18 of the inner clutch member, the disks being arranged in a stack with the two kinds of disks alternating, all as is usual in such type of clutch; whereby obviously compression of the disks together in the stack will provide friction bearing of great area effective between the shafts 8 and 10, and release of such pressure will release such friction coupling between the shafts. Such pressure is provided by a pressure member 21, having a face 23 bearing against the first of the disks 20, which disk is one keyed with the shaft 8, the opposite end disk being preferably so keyed. This member has a threaded periphery which is turned into a corresponding internally threaded part of the clutch member 16, as indicated at 22. These threads are of relatively steep pitch, and run in such direction that as the engine tends to overrun the wheel of the vehicle, the clutch member 16 tends to overrun the pressure member 21. The drag of the clutch causes the pressure member to advance into the clutch member 16, clamping together the disks 20, and thus driving the shaft 8. On the other hand, as soon as the wheel tends to overrun the engine, the friction at the face 23 rotates the pressure member 21 in the opposite direction, moving the pressure member along the threads 22 to relieve pressure between disks 20.

The result of such automatic functioning of the parts will be appreciated as simply the same results heretofore obtained where any other type of overrunning clutch has been employed to provide the "free-wheeling" operation.

But according to my invention the overrunning clutch may be caused to engage at the will of the operator regardless of the relative speeds of engine and wheel; and since operator-operated engagement is neither necessary nor desirable except when the vehicle is to be decelerated, I associate with the brake-actuating means the actuating means for such engagement. To this end a collar 24 is provided for free running upon the shaft 8 adjacent a hub portion 25 of the pressure member 21 of the clutch, which member also is free for rotation relative to the shaft 8. Antifriction thrust bearing as indicated at 26, is also preferably arranged between the parts as indicated. A lever 27 is connected at one end with the collar 24, at its other end with the brake rod 14 and at an intermediate point has connection by a rod 28 with the brake pedal 15. It will be apparent that the arrangement is such as to provide a differential application of the brake to the wheel and of the pressure member 21 to the overrunning clutch, whereby depression of the brake pedal 15 will both apply the brake and engage the overrunning clutch; the harder the brake is applied, the greater will be the clutch-engaging pressure upon the member 21. The position of the connection between the brake rod 28 and the lever 27 is preferably such that most of the decelerating force provided by the operator against the pedal 15, is effective upon the braking system, and engagement of the overrunning clutch is very gradual, and capacities and proportions of the parts will of course dictate the actual leverages to be provided.

In operation, when the brakes are applied, the collar 24 will bear against the pressure member 21 causing it to move inwardly of the clutch member 16 to compress the clutch disks 20, this movement being allowed by the steep pitch of the threads 22. The clutch engagement will be very gradual since the more pressure is exerted by the pressure member, the more its advance will be opposed by its friction against the end disk.

Nevertheless, upon application of the brake, ultimately engagement of the overrunning clutch will take place and the engine speed thus brought up to one corresponding with that of the wheels. Consequently upon release of the brake although the engine had previously stalled, it will already be in operation and ready for the succeeding acceleration period.

To insure delayed engagement of the overrunning clutch when the vehicle and consequently the wheel is operating at a high speed, I arrange to oppose clutch-engaging actuation of the collar 24, means responsive to the speed of the shaft 8. As here shown such means comprise flyball weights 29 mounted upon levers 30 carried by a head 31 rigidly secured with the shaft 8. Associated with the parts is a sleeve 32 having a flange 33 effective between the collar 24 and the pressure member 21, and a flange 34 effective between the collar 24 and the levers 30. Obviously during operation of the shaft 8 centrifugal force of the weights 29 opposes clutch-engaging forces applied through the collar 24, and in proportion to speed of the shaft 8. Thus the faster the vehicle is moving, when the brake pedal 15 is depressed, the more of the decelerating force provided by the operator will be effective upon the brakes, and the less upon the overrunning clutch; but as the vehicle speed decreases, more of this force will be exerted upon the clutch and ultimately the latter will be engaged; the proportion and arrangement of the parts being such that the clutch is engaged before the vehicle is at a stand-still.

What I claim is:

1. In a vehicle, a wheel, motor means, and a drive for connecting said wheel with said motor means, said drive including clutch means arranged for automatic operation permitting said motor means to drive said wheel but allowing said wheel to overrun said motor means, associated friction clutch means arranged for engagement by operator controlled effort to permit said wheel to drive said motor means, and speed responsive means arranged to oppose said operator controlled effort dependent upon the speed of said vehicle.

2. In a vehicle, a wheel, brake means therefor, motor means, and a drive for connecting said wheel with said motor means, said drive including clutch means automatically permitting said motor means to drive said wheel but allowing said wheel to overrun said motor means, associated friction clutch means arranged to permit said wheel to drive said motor means, means associating said friction clutch means with said brake means for coordinated actuation of both by a common operator controlled effort to cause engagement of said friction clutch means dependent upon application of said brake means, and speed responsive means arranged to control the distribution of the effectiveness of said effort between said brake and clutch means dependent upon the speed of said vehicle.

3. In a vehicle, a wheel, brake means therefor, motor means, and a drive for connecting said wheel with said motor means, said drive including overrunning clutch means automatically permitting said motor means to drive said wheel but allowing said wheel to overrun said motor means, friction clutch means associated with said overrunning clutch means to permit said wheel to drive said motor means, and control means interassociating said friction clutch means with said brake means to cause engaging operation of said friction clutch means dependent upon application of said brake means, said control means including differential means whereby operator actuating effort is effective in differential relation upon said brake means and said friction clutch means.

4. In a vehicle, a wheel, brake means therefor, motor means, and a drive for connecting said wheel with said motor means, said drive including clutch means automatically permitting said motor means to drive said wheel but allowing said wheel to overrun said motor means, associated clutch means arranged for actuation to cause said wheel to drive said motor means, and control means interassociating said associated clutch and brake means to cause engaging operation of said associated clutch means dependent upon application of said brake means, said control means including differential means whereby braking effort is effective in differential relation upon said brake means and said clutch means.

5. In a vehicle, a wheel, brake means therefor, motor means, and a drive for connecting said wheel with said motor means, said drive including clutch means automatically permitting said motor means to drive said wheel but allowing said wheel to overrun said motor means, associated clutch means arranged for actuation to cause said wheel to drive said motor means, and control means interassociating said associated clutch and brake means to cause engaging operation of said associated clutch means dependent upon application of said brake means, said control means including differential means whereby braking effort is effective in differential relation upon said brake means and said associated clutch means, and means responsive to the vehicle speed arranged to control said differential relation.

FRANK R. HIGLEY.